(12) United States Patent
Davey-Rogers et al.

(10) Patent No.: US 10,417,292 B2
(45) Date of Patent: Sep. 17, 2019

(54) METHOD AND SYSTEM FOR ASSESSMENT OF RETIREMENT COMMUNITIES AND RESIDENTS

(71) Applicant: MasterCard International Incorporated, Purchase, NY (US)

(72) Inventors: Nadine Davey-Rogers, Miami Shores, FL (US); Serge Bernard, Danbury, CT (US); Henry Weinberger, New York, NY (US); Pavel Umanski, Brooklyn, NY (US); Edward Lee, Scarsdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 416 days.

(21) Appl. No.: 15/200,227

(22) Filed: Jul. 1, 2016

(65) Prior Publication Data
US 2018/0004849 A1 Jan. 4, 2018

(51) Int. Cl.
*G06F 17/30* (2006.01)
*G06F 16/9535* (2019.01)
(Continued)

(52) U.S. Cl.
CPC ........ *G06F 16/9535* (2019.01); *G06F 16/285* (2019.01); *G06F 16/29* (2019.01);
(Continued)

(58) Field of Classification Search
CPC ......... G06F 17/30867; G06F 17/30241; G06F 17/30598; G06F 16/9535; G06F 16/285;
(Continued)

(56) References Cited

U.S. PATENT DOCUMENTS

| 2010/0205112 A1* | 8/2010 | Reynolds | G06Q 40/00 705/36 R |
| 2012/0042253 A1* | 2/2012 | Priyadarshan | G06Q 30/02 715/733 |

(Continued)

OTHER PUBLICATIONS

U.S. Appl. No. 14/971,177, filed Dec. 16, 2015 entitled Method and System for Generation of Indices Regarding Neighborhood Growth.

*Primary Examiner* — Huawen A Peng
(74) *Attorney, Agent, or Firm* — Buchanan Ingersoll & Rooney PC

(57) ABSTRACT

A method of identifying retirement communities, comprising: executing a query on the transaction database and the geo-demo database to identify a plurality of community clusters; electronically storing, a plurality of retirement community data, wherein each retirement community data includes a plurality of data elements including at least a first data element configured to store the plurality of community clusters; receiving, a data signal superimposed with profile information associated with a consumer, wherein the profile information includes a plurality of retirement community attributes identified by the consumer; and identifying one or more retirement communities based on attributes identified by the consumer, by querying the community clusters stored in the retirement community database for retirement community attributes identified by the consumer.

20 Claims, 6 Drawing Sheets

(51) Int. Cl.
*H04L 29/08* (2006.01)
*G09B 7/00* (2006.01)
*G06F 16/29* (2019.01)
*G06F 16/28* (2019.01)
*G09B 5/00* (2006.01)

(52) U.S. Cl.
CPC ............... *G09B 5/00* (2013.01); *G09B 7/00* (2013.01); *H04L 67/306* (2013.01)

(58) Field of Classification Search
CPC .. G06F 16/29; G09B 5/00; G09B 7/00; H04L 67/306
See application file for complete search history.

(56) References Cited

U.S. PATENT DOCUMENTS

| | | | |
|---|---|---|---|
| 2013/0023274 A1 | 1/2013 | Meredith et al. | |
| 2013/0024242 A1 | 1/2013 | Villars et al. | |
| 2013/0191394 A1* | 7/2013 | Bradley | G06Q 10/10 707/738 |
| 2013/0254035 A1* | 9/2013 | Ramer | G06Q 30/0267 705/14.62 |
| 2014/0237053 A1* | 8/2014 | Abhyanker | H04W 4/21 709/204 |
| 2015/0220951 A1* | 8/2015 | Kurapati | G06Q 30/0204 705/7.33 |

* cited by examiner

METHOD AND SYSTEM FOR ASSESSMENT OF RETIREMENT COMMUNITIES AND RESIDENTS

FIELD

The present disclosure relates to a method and system to find an ideal retirement community for prospective retirees.

BACKGROUND

Consumers may find their ideal retirement community using current methods such as paid advertising, utilizing the American Association of Retired Persons (AARP), profiling a market with geographic proximity data, and/or profiling demographic data such as home value, and/or taxes. However, a consumer would not know about specific retirement communities in the market, and a discretionary spending behavior profile of those communities which might be important to a prospective retiree. This data may help estimate true expenses living in the community and determine whether the activities the consumer likes to spend on would be available in their retirement community. Additionally, this data may benefit many merchants, advertisers, and other entities who are often interested in determining what kind of information influences consumers, analyzing such information, and determining how they can use the information to their advantage.

However, while many methods and systems have been developed to measure the effectiveness of various types of influences, such as advertising, coupons or offers, consumer reviews, and the like, many methods and systems fail to identify, let alone measure, the effectiveness providing an accurate retirement community for consumers. Further, traditional approaches to determining an appropriate retirement community are labor intensive, often inaccurate or incomplete, lack objectivity, and are often based on impressions rather than facts.

Thus, there is a need for a technical solution to find an appropriate and even ideal retirement community for prospective retirees.

SUMMARY

The present disclosure provides a description of systems and methods to find an ideal retirement community for prospective retirees.

A method of identifying retirement communities, comprising: electronically storing, in a transaction database of a processing server, a plurality of transaction data, wherein each transaction data is formatted based on one or more standards and includes a plurality of data elements including at least a first data element configured to store a transaction geographic location and one or more additional data elements configured to store transaction data, wherein the transaction geographic location is included in a geographic area of a plurality of geographic areas; electronically storing, in a geo-demo database of a processing server, a plurality of geo-demo data, wherein each geo-demo data is formatted based on one or more standards and includes a plurality of data elements including at least a first data element configured to store a geo-demo geographic location and one or more additional data elements configured to store geographic attribute data, wherein the geo-demo geographic location is included in the geographic area of the plurality of geographic areas; executing, by a querying module of the processing server, a query on the transaction database and the geo-demo database to identify a plurality of community clusters, wherein each community cluster is associated based on the transaction geographic location and the geo-demo geographic location; electronically storing, in a retirement community database of the processing server, a plurality of retirement community data, wherein each retirement community data is formatted based on one or more standards and includes a plurality of data elements including at least a first data element configured to store the plurality of community clusters; receiving, by a receiving device of the processing server, a data signal electronically transmitted via a communication network, wherein the data signal is superimposed with profile information associated with a consumer, wherein the profile information includes a plurality of retirement community attributes identified by the consumer; and identifying, by a retirement community scoring module of the processing server, one or more retirement communities based on attributes identified by the consumer, by querying the community clusters stored in the retirement community database for retirement community attributes identified by the consumer.

A system of identifying retirement communities, comprising: a transaction database of a processing server configured to electronically store a plurality of transaction data, wherein each transaction data is formatted based on one or more standards and includes a plurality of data elements including at least a first data element configured to store a transaction geographic location and one or more additional data elements configured to store transaction data, wherein the transaction geographic location is included in a geographic area of a plurality of geographic areas; a geo-demo database of a processing server configured to electronically store a plurality of geo-demo data, wherein each geo-demo data is formatted based on one or more standards and includes a plurality of data elements including at least a first data element configured to store a geo-demo geographic location and one or more additional data elements configured to store geographic attribute data, wherein the geo-demo geographic location is included in the geographic area of the plurality of geographic areas; a querying module of the processing server configured to execute a query on the transaction database and the geo-demo database to identify a plurality of community clusters, wherein each community cluster is associated based on the transaction geographic location and the geo-demo geographic location; a retirement community database of the processing server configured to electronically store a plurality of retirement community data, wherein each retirement community data is formatted based on one or more standards and includes a plurality of data elements including at least a first data element configured to store the plurality of community clusters; a receiving device of the processing server configured to receive a data signal electronically transmitted via a communication network, wherein the data signal is superimposed with profile information associated with a consumer, wherein the profile information includes a plurality of retirement community attributes identified by the consumer; and a retirement community scoring module of the processing server configured to identify one or more retirement communities based on attributes identified by the consumer, by querying the community clusters stored in the retirement community database for retirement community attributes identified by the consumer.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
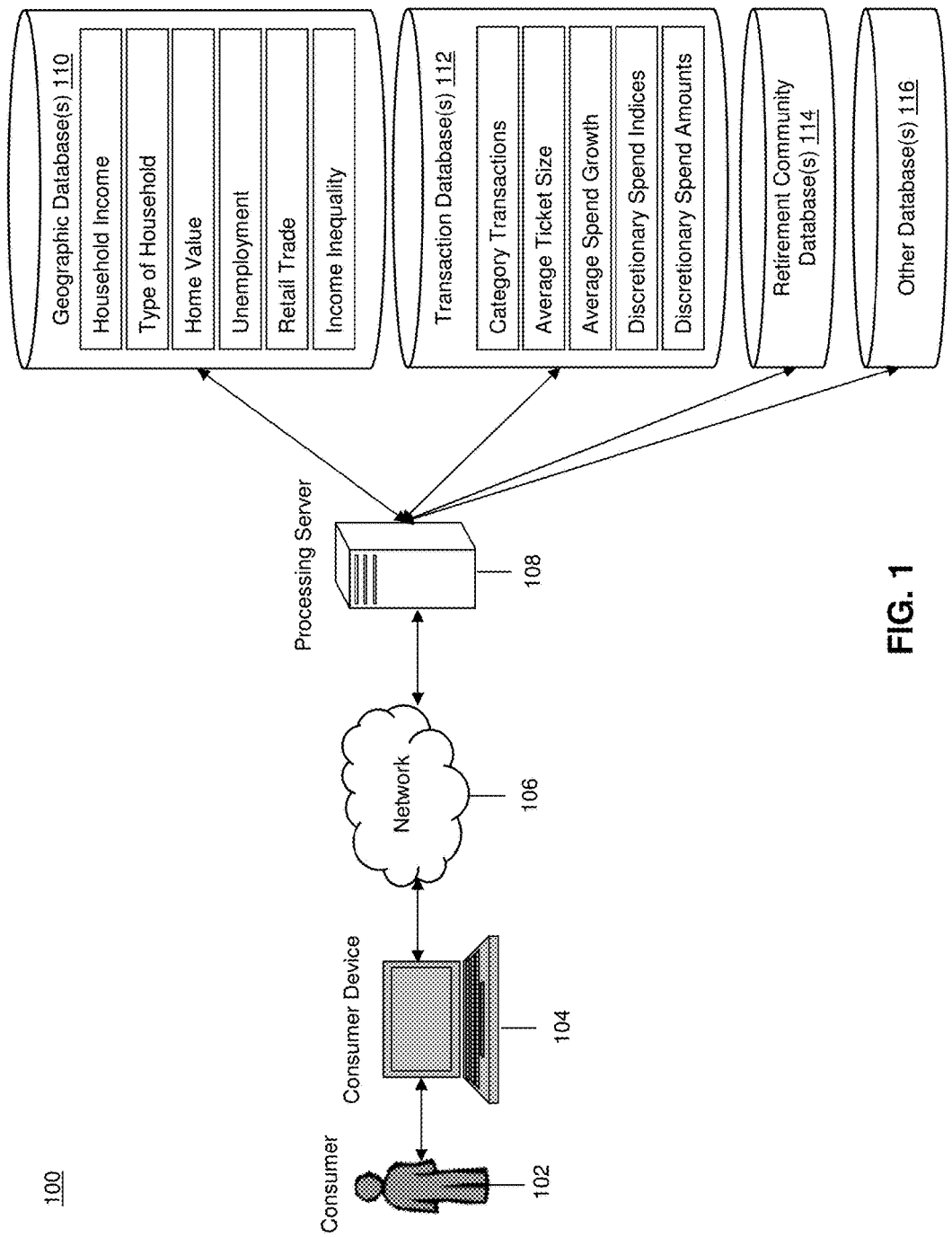
FIG. 1 is a high level architecture illustrating a system to find an ideal retirement community for prospective retirees in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Payment Account—A financial account that may be used to fund a transaction, such as a checking account, savings account, credit account, virtual payment account, etc. A payment account may be associated with an entity and/or consumer (used interchangeably), which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have and require special knowledge in offered products. In some embodiments, an entity involved in a single transaction may be considered a merchant. In some instances, as used herein, the term "merchant" may refer to an apparatus or device of a merchant entity.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

System for Linking Payment Accounts

FIG. 1 is a high level architecture illustrating a system 100 to find an ideal retirement community for prospective retirees in accordance with exemplary embodiments.

The system 100 may include a plurality of consumers 102. Each consumer 102 may be a member of a network of consumers. A consumer 102 may be involved in a plurality of payment transactions with one or more merchants in person and/or via consumer computing devices 104.

The system may include a network 106 which may be of any suitable type of network (e.g., payment network) and network topology and utilize communication protocols to carry data between the consumer device 104 and processing server 108 that is superimposed on data signals that are transmitted along a network infrastructure. The network 106 may be, for example, the Internet, a cellular communication network, a local area network, a wireless area network, and/or a radio frequency network, etc. In some instances, a combination of networks may be used in the network 106 to carry data signals between the consumer device 104 and processing server 108, such as a local area network, cellular communication network, the Internet, and/or any other processing devices.

The system may include a processing server 108 may comprise a plurality of modules and/or devices as explained in further detail below. The processing server 108 may be configured to electronically store a plurality of transaction data. Each transaction data may be formatted based on one or more standards and include a plurality of data elements including at least a first data element configured to store a transaction geographic location and one or more additional data elements configured to store transaction data. The transaction geographic location may be included in a geographic area of a plurality of geographic areas.

The processing server 108 may be configured to electronically store a plurality of geo-demo data. Each geo-demo data may be formatted based on one or more standards and include a plurality of data elements including at least a first data element configured to store a geo-demo geographic location and one or more additional data elements configured to store geographic attribute data. The geo-demo geographic location may be included in the geographic area of the plurality of geographic areas.

The processing server 108 may be configured to execute a query to identify a plurality of community clusters. Clusters may be determined via microsegments as identified without the user of personably identifiable information (PII), for example, in U.S. Publication No. 2013/0024242, Protecting Privacy in Audience Creation, and U.S. 2013/0023274, Method and System for Measuring Advertising Effectiveness using Microsegments, which are both herein incorporated by reference in their entirety. Each community cluster may be associated based on the transaction geographic location and the geo-demo geographic location.

The processing server 108 may be configured to electronically store a plurality of retirement community data. Each retirement community data may be formatted based on one or more standards and includes a plurality of data elements including at least a first data element configured to store the plurality of community clusters.

The processing server 108 may be configured to receive a data signal electronically transmitted via a communication network. The data signal may be superimposed with profile information associated with a consumer. In some implementations, the consumer may be a respective resident. The profile information may include a plurality of retirement community attributes identified by the consumer and stored in a consumer profile.

The consumer profiles may include, for example, information identifying consumers (e.g., a consumer name or handle, a number, an identifier, and/or other identifying information), security login information (e.g., a login code or password), payment account information, subscription information, bank and/or credit account information (e.g., related to currency held in credit for a consumer), relationship information (e.g., information related to relationships between consumers in the system with profiles), demographic information associated with consumers, information stated by consumers, purchase information of consumers, browsing history of consumers, a client computing platform identification associated with a consumer, a phone number associated with a consumer, and/or any other information related to consumers.

In some implementations, the consumer profile may store consumer retirement community preferences (e.g., attributes identified by the consumer) based on questions asked through a survey from the system. The questions will be described in further detail below.

The processing server 108 may be configured to identify one or more retirement communities based on attributes identified by the consumer, by querying the community clusters in a plurality of databases for retirement community attributes identified by the consumer.

The system may include a plurality of databases, including a geographic database 110, a transaction database 112, a retirement community database 114, and/or any other databases 116.

The geographic database 110 may comprise data regarding a plurality of variables including: household income, type of household, home value, unemployment rate, retail trade, income inequality, and/or any other variables.

Household income data may be a measure of the combined incomes of all people sharing a particular household or place of residence. It may include every form of income, e.g., salaries and wages, security benefits and/or any other benefits, retirement income, near cash government transfers like food stamps, and investment gains.

Type of household data may be the types of groupings of persons and living arrangements found in private households. Household may refer to a person or group of persons who occupy the same dwelling and do not have a usual place of residence elsewhere. The dwelling may be either a collective dwelling or a private dwelling. The household may consist of a family group such as a census family, of two or more families sharing a dwelling, of a group of unrelated persons or of a person living alone.

Home value data may be the price placed on a home by the corresponding government municipality to calculate property taxes. This value may be different than the appraisal fair market value of a property, and both and/or one may be used. Unemployment rate data may be a measure of the prevalence of unemployment and it is calculated as a percentage by dividing the number of unemployed people by all people currently in the labor force. Retail trade data may include establishments that are engaged in the sale of merchandise for personal and/or household consumption and in the rendering of services that are incidental to the sale of the merchandise. Other variables may include age, disability, education, family income, family size, and/or any other census measured variables to name a few examples.

The transaction database 112 may comprise data regarding a plurality of variables including: category transactions, average ticket size, average growth spend, discretionary spend indices, discretionary spend amounts and/or any other variables.

Category transactions data may be transactions that fit into different categories (e.g., dining, medical, shopping, food, entertainment, etc.). Category transactions data may provide an insight into where consumers spend their time and/or money. Average ticket size may be the amount consumers spend on average per transaction and/or computing an average size of consumer sales at a merchant and/or vendor. Average growth spend may be a calculation of the increasing spend of consumers over a period of time. Discretionary spend indices may be a measure of the amount of money spent by households and/or consumers. Discretionary spend amounts may represent the amount of income remaining after a person pays for personal necessities and taxes. Other variables may include age, disability, education, family income, family size, and/or any other census measured variables.

The retirement community database 114 may comprise a plurality of retirement community data, wherein each retirement community data is formatted based on one or more standards and includes a plurality of data elements including at least a first data element configured to store the plurality of community clusters Other databases 116 may store account information, census information, merchant information, and/or any other information. The databases may be a local database, which may be physically interfaced with the processing server 108 or a local computing system. In other embodiments, the database may be an external database, which may be accessed by the processing server 108 via remote computing techniques, such as via the network 106.

Processing Server

Figure 2:
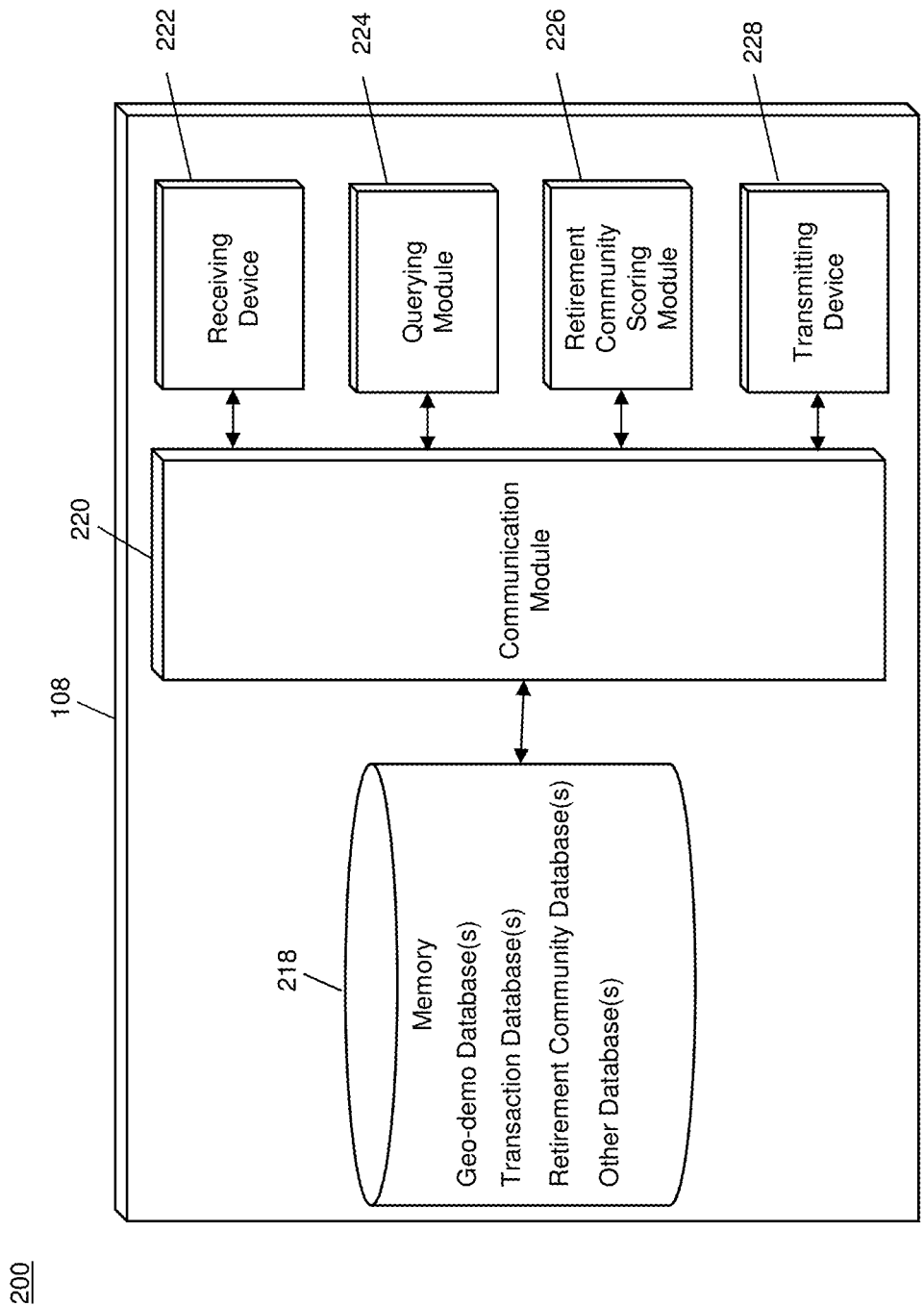
FIG. 2 is a block diagram illustrating the processing server of FIG. 1 to find an ideal retirement community for prospective retirees in accordance with exemplary embodiments.

FIG. 2 illustrates an embodiment of the processing server 108 of the system 100. It will be apparent to persons having skill in the relevant art that the embodiment of the processing server 108 illustrated in FIG. 2 is provided as illustration only and may not be exhaustive to all possible configurations of the processing server 108 suitable for performing the functions as discussed herein. For example, the computer system 600 illustrated in FIG. 6 and discussed in more detail below may be a suitable configuration of the processing server 108. The processing server 108 may be configured to perform the functions discussed herein as will be apparent to persons having skill in the relevant art. In some embodiments, the processing server 108 may include and/or be comprised of a plurality of engines and/or modules specially configured to perform one or more functions.

The processing server 108 may comprise a memory 218. The memory 218 may be configured to store data for use by the processing server 108 in performing the functions discussed herein. The memory 218 may be configured to store data using suitable data formatting methods and schema and may be any suitable type of memory, such as read-only memory, random access memory, etc. The memory 218 may include, for example, encryption keys and algorithms, communication protocols and standards, data formatting standards and protocols, program code for application programs, rules and algorithms for producing fraud scores, electronic ticket data and information, and other data that may be suitable for use by the processing server 108 in the performance of the functions disclosed herein as will be apparent to persons having skill in the relevant art. The memory 218 may comprise a plurality of databases such as: geo-demo databases, transaction databases, retirement community databases and/or any other databases.

A transaction database of a processing server 108 may be configured to electronically store a plurality of transaction data. Each transaction data may be formatted based on one or more standards and includes a plurality of data elements including at least a first data element configured to store a transaction geographic location and one or more additional data elements configured to store transaction data. The transaction geographic location may be included in a geographic area of a plurality of geographic areas.

The transaction data information may comprise at least two of: category transactions, average ticket size, average spend growth in key categories, discretionary spend indices, and discretionary spend amounts. Category transactions data may be transactions that fit into different categories (e.g., dining, medical, shopping, food, entertainment, etc.). Category transactions data may provide an insight into where consumers spend their time and/or money. Average ticket size may be the amount consumers spend on average per transaction and/or computing an average size of consumer sales at a merchant and/or vendor. Average growth spend may be a calculation of the increasing spend of consumers over a period of time. Discretionary spend indices may be a measure of the amount of money spent by households and/or consumers. Discretionary spend amounts may represent the amount of income remaining after a person pays for personal necessities and taxes. Other variables may include age, disability, education, family income, family size, and/or any other census measured variables.

A geo-demo database of a processing server 108 may be configured to electronically store a plurality of geo-demo data. Each geo-demo data may be formatted based on one or more standards and include a plurality of data elements including at least a first data element configured to store a geo-demo geographic location and one or more additional data elements configured to store geographic attribute data. The geo-demo geographic location may be included in the geographic area of the plurality of geographic areas.

The geographic attribute data may comprise at least one of: age information, occupation information, location information, household income data, type of households, unemployment rate, retail trade, sex information, race information, ethnicity information, household education information, and income inequality, as identified by averages, mean, percentages, per capita, and other statistical measures. Household income data may be a measure of the combined incomes of all people sharing a particular household or place of residence. It may include every form of income, e.g., salaries and wages, benefits and/or retirement income, near cash government transfers like food stamps, and investment gains.

The geographic area of a plurality of geographic areas may comprise at least one of: a zip code, a pre-defined geographic boundary, a city, a neighborhood. A pre-defined geographic boundary may be defined by the consumer and/or by an administrator.

A retirement community database of the processing server may be configured to electronically store a plurality of retirement community data. Each retirement community data may be formatted based on one or more standards and include a plurality of data elements including at least a first data element configured to store the plurality of community clusters.

The processing server 108 may comprise a communication module 220. The communication module 220 may be configured to transmit data between modules, engines, databases, memories, and other components of the processing server 108 for use in performing the functions discussed herein. The communication module 220 may be comprised of one or more communication types and utilize various communication methods for communications within a computing device. For example, the communication module 220 may be comprised of a bus, contact pin connectors, wires, etc. In some embodiments, the communication module 220 may also be configured to communicate between internal components of the processing server 108 and external components of the processing server 108, such as externally connected databases, display devices, input devices, etc.

The processing server 108 may include a receiving device 222. The receiving device 222 of the processing server 108 may be configured to receive a data signal electronically transmitted via a communication network. The data signal may be superimposed with profile information associated with a consumer. The profile information may include a plurality of retirement community attributes identified by the consumer. The processing server 108 may display on an input device, a questionnaire to determine the plurality of retirement community attributes identified by the consumer. In some implementations, the questionnaire may dynamically change the content of the questionnaire based on previously input attributes identified by the consumer and/or entity.

For example, if a consumer identifies an attribute, such as wanting to find a retirement community near water (e.g., lake, marina, ocean, rivers, etc.), the next series of questions may be designed to further probe options and/or attributes relating to communities near water. The attributes near water may be type of water such as ocean, lake, river, stream, pond, manmade, etc.

The receiving unit 202 may be configured to receive data over one or more networks via one or more network protocols. The receiving unit 202 may receive data related to payment transactions from the payment network 106 for a plurality of payment transactions involving consumers 102 and merchants. The received data may be stored in a transaction database (e.g., memory 218) as a plurality of transaction data entries.

The processing server 108 may comprise a querying module 224. A querying module 224 of the processing server 108 may be configured to execute a query on the transaction database (e.g., memory 218) and the geo-demo database (e.g., memory 218) to identify a plurality of community clusters, wherein each community cluster is associated based on the transaction geographic location and the geo-demo geographic location.

The processing server 108 may comprise a retirement community scoring module 226. A retirement community scoring module 226 of the processing server 108 may be configured to identify one or more retirement communities based on attributes identified by the consumer, by querying the community clusters stored in the retirement community database for retirement community attributes identified by the consumer.

The at least one retirement community identified may be displayed in order of highest percentage to lowest percentage of compatibility with the plurality of retirement community attributes identified by the consumer. For example, if community A is identified as 76% compatible, community B is identified as 90% compatible, and community C is identified as 54% compatible, the communities may be presented to the consumer as B, A, C based on their percentage of compatibility.

The at least one retirement community may be stored with the profile information of the consumer. In some implementations, the retirement community identified may be displayed when the percentage of compatibility with the plurality of retirement community attributes identified by the consumer exceeds a threshold value. In some implementations, the threshold value may be input by the consumer. For example, the consumer may indicate that they want to see only communities that are above 75% compatible to their preferences. Using the example above, the system may then show the consumer community B and A since they are greater than 75% compatible with the consumer's preferences.

In some implementations, the plurality of retirement community attributes may be identified by the consumer comprise at least one constraint that restricts the identification of retirement communities displayed on a consumer device to retirement communities that do not comprise the constraint. For example, constraints may incorporate limiting factors, such as cost thresholds (e.g., communities in certain price range, entertainment spend thresholds, dining spend thresholds, weather ranges, geographic location, etc.).

The processing server 108 may further include a transmitting device 228. The transmitting device 228 may be configured to transmit data over one or more networks via one or more network protocols. In some embodiments, the transmitting device 228 may be configured to transmit data over the payment rails, such as using specially configured infrastructure associated with payment networks (e.g., network 106) for the transmission of transaction messages that include sensitive financial data and information, such as identified payment credentials. In some instances, the transmitting device 228 may be configured to transmit data to merchants, mobile devices, application servers, issuers, consumer devices 104, and/or other entities via alternative networks, such as the Internet.

In some embodiments, the transmitting device 228 may be comprised of multiple units, such as different transmitting units for transmitting data over different networks, such as a first transmitting unit for transmitting data over the payment rails and/or a second transmitting unit for transmitting data over the Internet. The transmitting device 228 may electronically transmit data signals that have data superimposed that may be parsed by a receiving computing device. In some instances, the transmitting device 228 may include one or more modules for superimposing, encoding, or otherwise formatting data into data signals suitable for transmission. When a request for data is received, the processing server 108 may be configured to identify the data request, and may instruct the transmitting unit 228 to transmit the data in response to the received request, using methods and systems that will be apparent to persons having skill in the relevant art.

Figure 3:
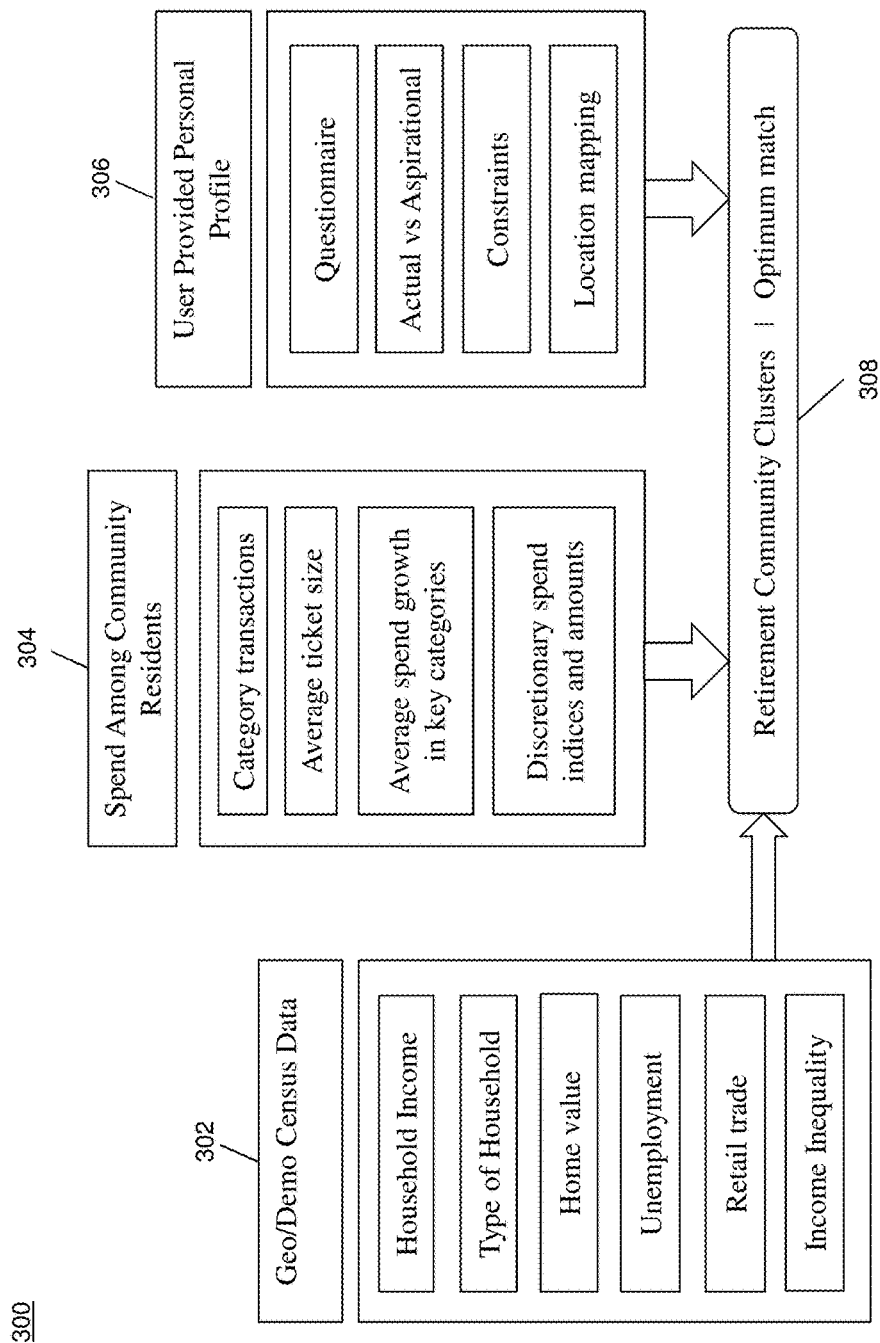
FIG. 3 is a diagram illustrating a process to find an ideal retirement community for prospective retirees using the processing server of FIG. 2 in accordance with exemplary embodiments.

Diagram for Illustrating a Process to Find an Ideal Retirement Community for Prospective Retirees FIG. 3 is a diagram 300 illustrating a process to find an ideal retirement community for prospective retirees using the processing server of FIG. 2 in accordance with exemplary embodiments.

In an exemplary embodiment, each retirement community (planned and informal) may be profiled by various categories (i.e., discretionary spend by category) being made by consumers (e.g., consumers) in those communities. Combining the retirement community profiles with demographic information of those consumers (i.e. age) and/or geographic information (e.g., climate, pop density) may create a composite pattern profile for each community. Similar communities may then be clustered to create an actionable set of retirement profiles. The system may then compare a consumer's personal spend and/or demographic profile to these clusters, to find the ideal cluster for them, with regards to actual discretionary activities available, and level of expense to be expected.

Each prospective resident (e.g., consumer 102) may create a personal profile that is then matched to retirement community clusters. Retirement community clusters and/or the optimum match 308 is determined by obtaining a user provided personal profile 306. The user provided personal profile 306 may consist of a questionnaire asking the prospective resident a series of questions based on what type of retirement community the prospective resident aspires for and what their realistic expectations may be, if there are any constraints (e.g., factors which are not negotiable in a retirement community), and/or the location the prospective resident desires. Next, the system may query a plurality of databases, such as a geographic/demographic census database 302, and/or a spend among community residents database 304 to determine the optimum match 308 of retirement communities to provide to the prospective resident. In some implementations, the geographic/demographic census database 302 may comprise various categories of data, such as: household income, type of household, unemployment, retail trade, and/or income inequality. In some implementations, the spend among community residents database may comprise various categories of data, such as: category transaction, average ticket size, average spend growth in key categories, and/or discretionary spend indices and amounts.

In an exemplary embodiment, the prospective resident may find herself closest to a community in a dry and/or warm climate, where the average spend does not exceed $80,000, where an average of $2,500 is spent on golf related activities, and $500 on regional theatre. In this community, the average spend on child care may be $0, but children's toys may be $200 per year. Restaurant spend may be higher than average at $4,000 per year, however, the average ticket may be lower than the national average within the community. The consumer's profile may indicate they want an area where more than 50% of residents are between the ages of 65-80. In an exemplary embodiment, the system may match the consumer up with a "Golfers Paradise" cluster with communities outside Scottsdale Ariz., and Albuquerque, N. Mex.

Figure 4:
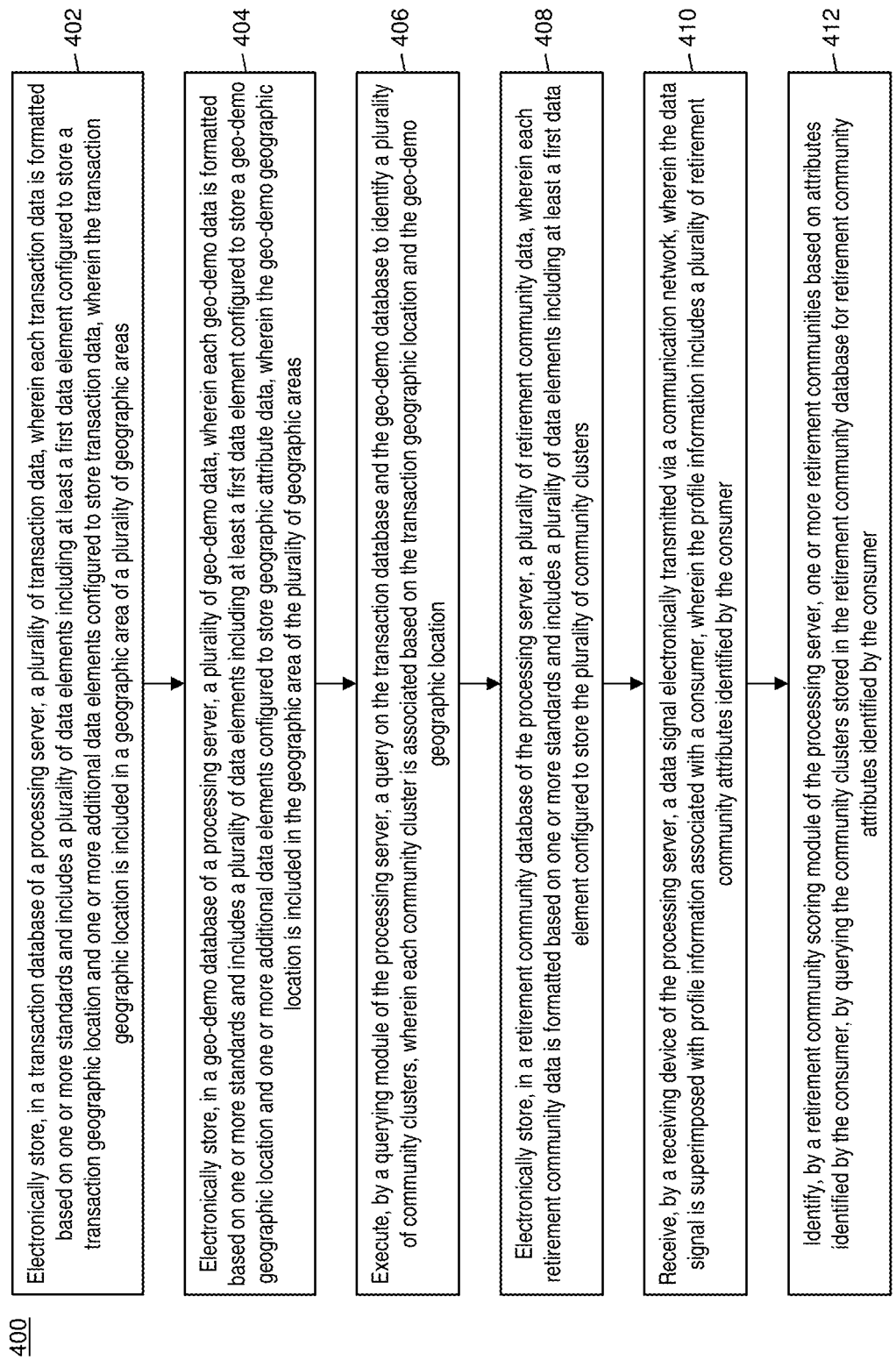
FIG. 4 is a flow diagram illustrating a method to find an ideal retirement community for prospective retirees in accordance with exemplary embodiments.

Exemplary Method for Find an Ideal Retirement Community for Prospective Retirees FIG. 4 is a flow diagram illustrating a method 400 to find an ideal retirement community for prospective retirees in accordance with exemplary embodiments.

In step 402, a transaction database (e.g., memory 218) of a processing server 108 may electronically store a plurality of transaction data, wherein each transaction data is formatted based on one or more standards and includes a plurality of data elements including at least a first data element configured to store a transaction geographic location and one or more additional data elements configured to store transaction data. The transaction geographic location may be included in a geographic area of a plurality of geographic areas. The transaction data information may comprise of one or more of: category transactions, average ticket size, average spend growth in key categories, discretionary spend indices, and discretionary spend amounts. In some implementations, the transaction database may provide data which may be queried to create the retirement community clusters. For example, in U.S. application Ser. No. 14/971,177, Method and System for Generation of Indices Regarding Neighborhood Growth, which is herein incorporated by reference in its entirety, may provide examples of querying various databases in order to make an accurate data analysis.

Data analyzed from the transaction database may provide accurate predictions for a prospective resident with respect to spending. For example, category transactions may identify the types of places (e.g., mall, grocery store, gym) and/or things (e.g., golfing equipment, household goods, travel, etc.) various retirees spend on within certain communities. The category transactions may identify how much retirees may spend in various categories, and/or how much additional (e.g., discretionary spend income the retirees may have. This data is particularly helpful for a prospective retiree in finding the proper retirement community in order to help the prospective retiree fit in. For example, if one retirement community spends an extra amount of money on outdoor activities (e.g., golf, fishing, etc.), and the prospective retiree is more of an indoor person, that retirement community might not be suitable for the prospective retiree.

In step 404, a geo-demo database (e.g., memory 218) of a processing server 108 may electronically store a plurality of geo-demo data. Each geo-demo data may be formatted based on one or more standards and includes a plurality of data elements including at least a first data element configured to store a geo-demo geographic location and one or more additional data elements configured to store geographic attribute data. The geo-demo geographic location may be included in the geographic area of the plurality of geographic areas.

The geographic attribute data may comprise at least one of: age information, occupation information, location information, household income, type of household, unemployment rate, retail trade, sex information, race information, ethnicity information, household education information, and income inequality. The geographic area of a plurality of geographic areas may comprise at lease on of: a zip code, a pre-defined geographic boundary, a city, and/or a neighborhood.

Data analyzed from the geographic and/or demographic database may provide accurate predictions for a prospective resident with respect to type of people in a prospective retirement community. For example, household income may identify how much money the average household is worth in the prospective retirement community. The type of household may identify whether the community is condo style living, consists of single family units, are townhomes, etc. The value of the homes may help a prospective retiree assess whether they can afford the home. Unemployment may help identify the type of people living in the community (e.g., mainly retired, welfare, working, etc.). Retail trade may be an indication of where most of the people within the community are spending their time and/or money. Income inequality may also be a factor which helps assess the people.

In step 406, a querying module 224 of the processing server 108 may execute a query (e.g., keyword or field limited search) on the transaction database and the geo-demo database to identify a plurality of community clusters. The querying may be implemented by algorithms for accessing and manipulating large sets and sequences. Query-processing algorithms and/or software may comprise iterative execution of complex query evaluation plans, the duality of sort- and hash-based set-matching algorithms, types of parallel query execution, special operators for emerging database application domains and/or any other querying technique may be implemented. Each community cluster may be associated based on the transaction geographic location and the geo-demo geographic location. For instance, a community cluster may be identified for a specific geographic area, with attributes for that community cluster being based on the transaction data for transactions having a transaction geographic location included in the specific geographic area and the geo-demo data associated with a geo-demo geographic location included in the specific geographic area. For example, the transaction data for transactions conducted in the specific geographic area may be analyzed to determine average spend across a plurality of categories, average household income, preferred types of spending, etc. for individuals in the geographic area. Geo-demo data may be analyzed for the specific geographic area to identify the age, gender, occupation, education level, etc. of individuals and/or families in the specific geographic area. Such information may comprise the attributes for the community cluster, as identified via the query of the transaction database and geo-demo database. Such community clusters may be identified for a plurality of different geographic areas, which may be defined by any suitable method, such as latitude and longitude, municipality borders (e.g., cities, counties, states, etc.), zoning lines, neighborhood demarcations, etc. The user provided personal profile may provide the data points to initialize the query. For example, if the personal profile indicates the region the prospective retiree desires to retire would be the south west region of the United States, the query may start by limiting the search to a particular region and may identify community clusters associated with geographic areas in that particular region. Additionally, based on the identified information, the query may further limit the results and display them according to percentage of compatibility. For instance, as discussed below, each community cluster may be assigned a percentage of compatibility between the attributes associated with that community cluster and the personal profile of the user.

The plurality of retirement community attributes may be identified by the consumer may comprise at least one constraint that restricts the identification of retirement communities displayed on a consumer device to retirement communities which do not comprise the constraint. In some implementations, the constraint may be a maximum and/or minimum limit of finances and/or type of home. For example, a prospective retiree may indicate that they want to live in a condo with 3 bedrooms, 2 full baths, and want to pay not more than $400,000, but no less than $250,000. The prospective retiree may further indicate information, such as year built of the condo, and/or average discretionary spend within the community. For example, the prospective retiree may not want to spend more than $500/month on extra activities. In order for the prospective retiree to completely fit in to the retirement community, the more likeminded people and/or community identified for the prospective retiree, the more likely the community will be more ideal for the prospective retiree.

In step 408, a retirement community database (e.g., memory 218) of the processing server 108 may electronically store data for a plurality of retirement communities. Each retirement community data may be formatted based on one or more standards and include a plurality of data elements including at least a first data element configured to store the plurality of community clusters. The at least one retirement community identified may be displayed in order of highest percentage to lowest percentage of compatibility with the plurality of retirement community attributes identified by the consumer. Percentage of compatibility may be calculated based on correspondence between the attributes associated with each community cluster and the retirement community attributes identified by the consumer. For instance, the percentage may be a ratio of how many of the retirement community attributes identified by the consumer are assigned to the respective community cluster, out of the total number of attributes identified by the retiree. In an example, if the prospective retiree is 90% compatible with community A (e.g., where community A has 9 of the 10 attributes identified by the retiree), and 80% compatible with community B (e.g., where community B has 8 of the 10 attributes), the communities will be listed in order of A, B. In some implementations, the percentage of compatibility may be displayed to the prospective retiree. In some instances, the retiree or the system may weight one or more attributes, such as placing a higher weight on a geo-demo attribute of an area (e.g., average temperature) than on other attributes, such as in instances where such an attribute may be more important to the retiree. In such instances, the calculation of the percentage may take such weights into account.

The records of the at least one retirement community stored with the profile information of the consumer may be displayed when the percentage of compatibility with the plurality of retirement community attributes identified by the consumer exceed a threshold value. The threshold value may be input by the consumer. In some implementations, the prospective retiree may indicate that they do not want to see any results with less than 50% compatibility. The system may then only show the prospective retirement communities which are greater than 50% compatible with the prospective retiree.

In step 410, a receiving device 222 of the processing server 108 may receive a data signal electronically transmitted via a communication network. The data signal may be superimposed with profile information associated with a consumer. The profile information may include a plurality of retirement community attributes identified by the consumer. A questionnaire may be displayed to determine the plurality of retirement community attributes identified by the consumer. The content of the questionnaire may be dynamically changed based on previously input attributes identified by the consumer. For example, if a consumer identifies an attribute, such as wanting to find a retirement community near water (e.g., lake, marina, ocean, rivers, etc.), the next series of questions may be designed to further probe options and/or attributes relating to communities near water. The attributes near water may be type of water such as ocean, lake, river, stream, pond, manmade, etc.

In step 412, a retirement community scoring module 226 of the processing server 108 may identify one or more retirement communities based on attributes identified by the consumer, by querying the community clusters stored in the retirement community database for retirement community attributes identified by the consumer. The determined retirement communicates may be transmitted by the transmitting device 228 to the consumer device 104 based on the querying module 224. For example, the prospective retiree may receive a list of retirement communities which are compatible with the prospective retiree.

Payment Transaction Processing System and Process

Figure 5:
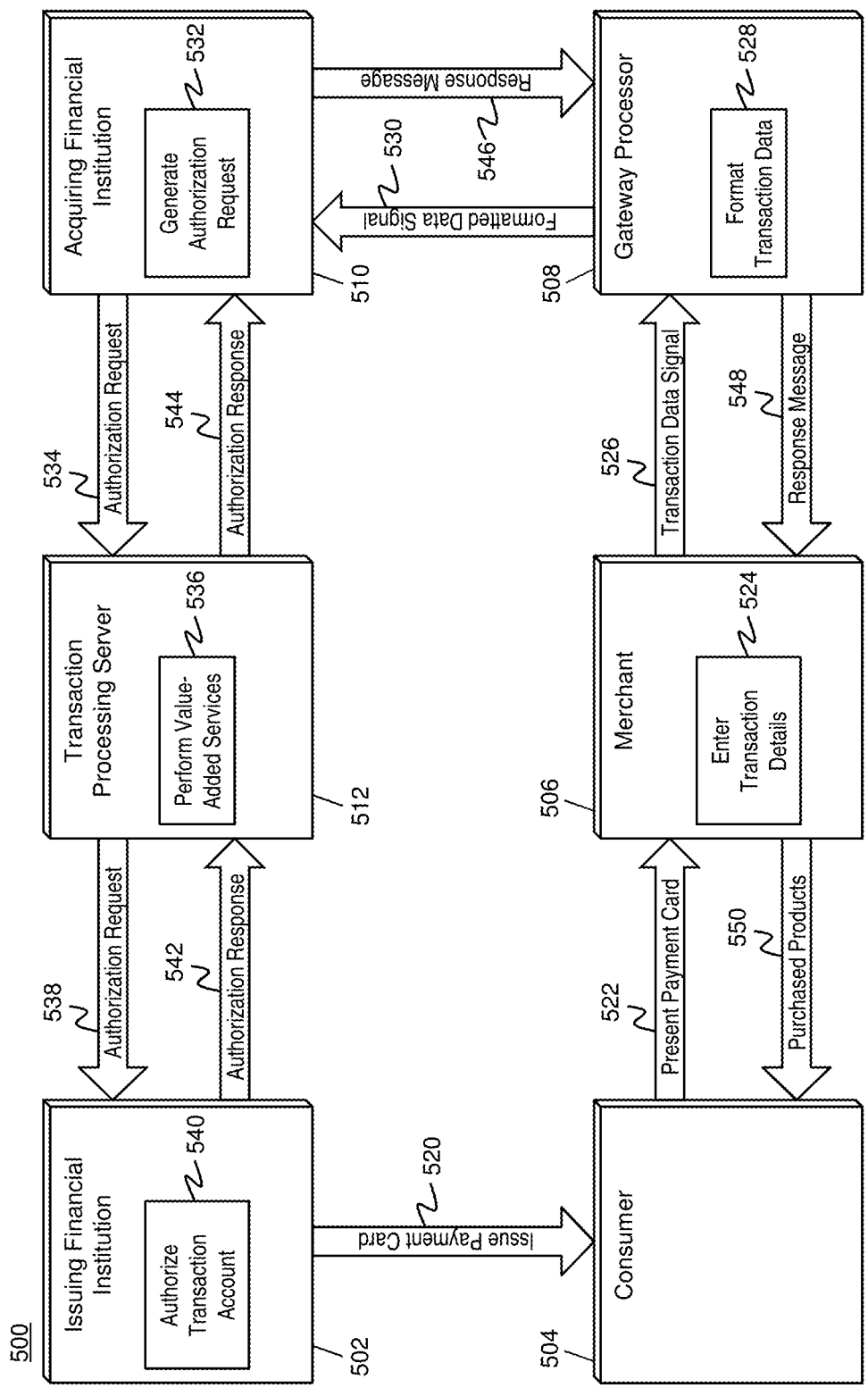
FIG. 5 is a flow diagram illustrating the processing of a payment transaction in accordance with exemplary embodiments.

FIG. 5 is a flow diagram illustrating the processing of a payment transaction in accordance with exemplary embodiments.

The process 500 and steps included therein may be performed by one or more components of the system 100 discussed above, such as the consumer 102, merchant, processing server 108, payment network 106, and issuer. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the process illustrated in FIG. 4, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a consumer, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 540 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
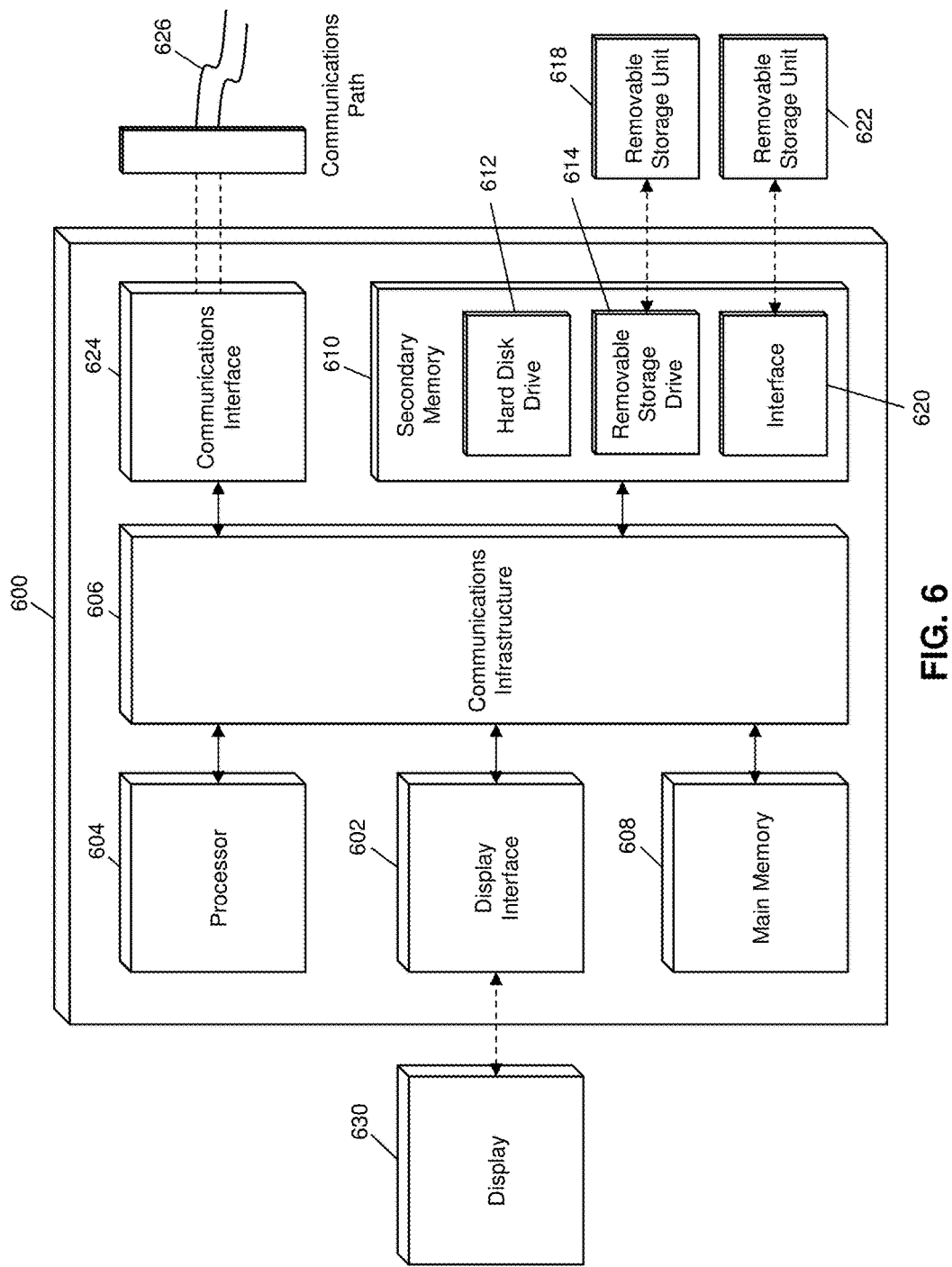
FIG. 6 is a block diagram illustrating a computer system architecture in accordance with exemplary embodiments.

FIG. 6 is a block diagram illustrating a computer system architecture in accordance with exemplary embodiments.

For example, the processing server 108 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media, such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for identifying music selections and visual content selections based on transaction history and consumer demographic characteristics. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of identifying retirement communities, comprising:

electronically storing, in a transaction database of a processing server, a plurality of transaction data associated with residents of retirement communities, wherein each transaction data is formatted based on one or more standards and includes a plurality of data elements including at least a first data element configured to store a transaction geographic location and one or more additional data elements configured to store transaction data, wherein the transaction geographic location is included in a geographic area of a plurality of geographic areas;

electronically storing, in a geo-demo database of a processing server, a plurality of geo-demo data associated with residents of retirement communities, wherein each geo-demo data is formatted based on one or more standards and includes a plurality of data elements including at least a first data element configured to store a geo-demo geographic location and one or more additional data elements configured to store geographic attribute data, wherein the geo-demo geographic location is included in the geographic area of the plurality of geographic areas;

executing, by a querying module of the processing server, a query on the transaction database and the geo-demo database to identify a plurality of community clusters, wherein each community cluster includes one or more retirement communities associated based on the transaction geographic location and the geo-demo geographic location of respective residents;

electronically storing, in a retirement community database of the processing server, a plurality of retirement community data, wherein each retirement community data is formatted based on one or more standards and includes a plurality of data elements including at least a first data element configured to store the plurality of community clusters;

receiving, by a receiving device of the processing server, a data signal electronically transmitted via a communication network, wherein the data signal is superimposed with profile information associated with a consumer, wherein the profile information includes a plurality of retirement community attributes identified by the consumer;

identifying, by a retirement community scoring module of the processing server, one or more retirement communities based on attributes identified by the consumer, by querying the community clusters stored in the retirement community database for retirement community attributes identified by the consumer;

calculating, by the retirement community scoring module, a percentage of compatibility value for each of the one or more identified retirement communities, each percentage of compatibility value measuring a compatibility of a respective retirement community with the attributes identified by the consumer; and generating, by a communication module of the processing server, a signal encoded with data for displaying a listing of any number of the one or more identified retirement communities based on corresponding percentage of compatibility values.

2. The method of claim 1, wherein the geographic attribute data comprises at least two of: age information, occupation information, location information, household income, type of household, unemployment rate, retail trade, sex information, race information, ethnicity information, household education information, and income inequality.

3. The method of claim 1, wherein the transaction data information comprises at least two of: category transactions, average ticket size, average spend growth in key categories, discretionary spend indices, and discretionary spend amounts.

4. The method of claim 1, wherein the plurality of retirement community attributes identified by the consumer comprise at least one constraint that restricts the identification of retirement communities displayed on a consumer device to retirement communities which do not comprise the constraint.

5. The method of claim 1, wherein the at least one retirement community of the consumer may be displayed in order of highest percentage to lowest percentage of compatibility with the plurality of retirement community attributes identified by the consumer.

6. The method of claim 1, wherein the at least one retirement community of the consumer may be displayed when the percentage of compatibility value with the plurality of retirement community attributes identified by the consumer exceed a threshold value.

7. The method of claim 6, wherein the threshold value is input by the consumer.

8. The method of claim 1, further comprising displaying on an input device a questionnaire to determine the plurality of retirement community attributes identified by the consumer.

9. The method of claim 8, further comprising dynamically chanting the content of the questionnaire based on previously input attributes identified by the consumer.

10. The method of claim 1, wherein the geographic area of a plurality of geographic areas comprises at least one of: a zip code, a pre-defined geographic boundary, a city, a neighborhood.

11. A system of identifying retirement communities, comprising:
- a transaction database of a processing server that electronically stores a plurality of transaction data associated with residents of retirement communities, wherein each transaction data is formatted based on one or more standards and includes a plurality of data elements including at least a first data element configured to store a transaction geographic location and one or more additional data elements configured to store transaction data, wherein the transaction geographic location is included in a geographic area of a plurality of geographic areas;
- a geo-demo database of a processing server that electronically stores a plurality of geo-demo data associated with residents of retirement communities, wherein each geo-demo data is formatted based on one or more standards and includes a plurality of data elements including at least a first data element configured to store a geo-demo geographic location and one or more additional data elements configured to store geographic attribute data, wherein the geo-demo geographic location is included in the geographic area of the plurality of geographic areas;
- a querying module of the processing server that executes a query on the transaction database and the geo-demo database to identify a plurality of community clusters, wherein each community cluster includes one or more retirement communities associated based on the transaction geographic location and the geo-demo geographic location of respective residents;
- a retirement community database of the processing server that electronically stores a plurality of retirement community data, wherein each retirement community data is formatted based on one or more standards and includes a plurality of data elements including at least a first data element configured to store the plurality of community clusters;
- a receiving device of the processing server that receives a data signal electronically transmitted via a communication network, wherein the data signal is superimposed with profile information associated with a consumer, wherein the profile information includes a plurality of retirement community attributes identified by the consumer; and
- a retirement community scoring module of the processing server that identifies one or more retirement communities based on attributes identified by the consumer, by querying the community clusters stored in the retirement community database for retirement community attributes identified by the consumer, and calculating a percentage of compatibility value for each of the one or more identified retirement communities, each percentage of compatibility value measuring a compatibility of a respective retirement community with the attributes identified by the consumer; and
- a communication module of the processing server that generates a signal encoded with data for displaying a listing of any number of the one or more identified retirement communities based on corresponding percentage of compatibility values.

12. The system of claim 11, wherein the geographic attribute data comprises at least two of: age information, occupation information, location information, household income, type of household, unemployment rate, retail trade, sex information, race information, ethnicity information, household education information, and income inequality.

13. The system of claim 11, wherein the transaction data information comprises at least two of: category transactions, average ticket size, average spend growth in key categories, discretionary spend indices, and discretionary spend amounts.

14. The system of claim 11, wherein the plurality of retirement community attributes identified by the consumer comprise at least one constraint that restricts the identification of retirement communities displayed on a consumer device to retirement communities which do not comprise the constraint.

15. The system of claim 11, wherein the at least one retirement community of the consumer may be displayed in order of highest percentage to lowest percentage of compatibility with the plurality of retirement community attributes identified by the consumer.

16. The system of claim 11, wherein the at least one retirement community of the consumer may be displayed when the percentage of compatibility value with the plurality of retirement community attributes identified by the consumer exceed a threshold value.

17. The system of claim 16, wherein the threshold value is input by the consumer.

18. The system of claim 11, further comprising displaying on an input device a questionnaire to determine the plurality of retirement community attributes identified by the consumer.

19. The system of claim 11, further comprising dynamically chanting the content of the questionnaire based on previously input attributes identified by the consumer.

20. The system of claim 11, wherein the geographic area of a plurality of geographic areas comprises at least one of: a zip code, a pre-defined geographic boundary, a city, a neighborhood.

* * * * *